US010355967B2

(12) United States Patent
Sharma

(10) Patent No.: US 10,355,967 B2
(45) Date of Patent: *Jul. 16, 2019

(54) OPTICAL CHARACTER RECOGNITION FOR VIDEO AUTOMATION

(71) Applicant: Comcast Cable Communications, LLC, Philadelphia, PA (US)

(72) Inventor: Ambud Sharma, West Chester, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 198 days.

This patent is subject to a terminal disclaimer.

(21) Appl. No.: 14/641,803

(22) Filed: Mar. 9, 2015

(65) Prior Publication Data
US 2015/0271049 A1 Sep. 24, 2015

Related U.S. Application Data

(63) Continuation of application No. 13/615,979, filed on Sep. 14, 2012, now Pat. No. 9,009,261.

(51) Int. Cl.
G06F 15/16 (2006.01)
H04L 12/26 (2006.01)
G06K 9/32 (2006.01)
H04N 21/234 (2011.01)
H04N 21/00 (2011.01)
G06K 9/62 (2006.01)
H04L 29/08 (2006.01)

(52) U.S. Cl.
CPC ............ H04L 43/50 (2013.01); G06K 9/3266 (2013.01); G06K 9/6202 (2013.01); H04L 67/10 (2013.01); H04N 21/00 (2013.01); H04N 21/23418 (2013.01); G06K 9/6259 (2013.01); G06K 2209/01 (2013.01)

(58) Field of Classification Search
CPC ............................ H04N 21/00; G06K 9/6259
See application file for complete search history.

(56) References Cited

U.S. PATENT DOCUMENTS

| 2008/0273114 | A1 | 11/2008 | Hardacker et al. | |
| 2011/0025842 | A1 | 2/2011 | King et al. | |
| 2012/0054567 | A1* | 3/2012 | Valakh ............. | G01R 31/31907 714/724 |
| 2013/0329023 | A1 | 12/2013 | Suplee, III et al. | |
| 2013/0346144 | A1 | 12/2013 | Ferren et al. | |
| 2016/0227281 | A1* | 8/2016 | Abuelsaad ......... | H04N 21/4583 |

* cited by examiner

Primary Examiner — Hitesh Patel
(74) Attorney, Agent, or Firm — Banner & Witcoff, Ltd.

(57) ABSTRACT

A video analysis system may utilize display screen snapshots captured from a device. The system may receive time information that indicates a time duration, position-related information that indicates a region, and reference information that indicates information expected to appear in the region during the time duration. The system may transmit an instruction to capture display screen snapshots during a time duration indicated by the time information. The system may receive a display screen snapshot and recognize information in the region indicated by the position-related information. The system may then determine whether the recognized information corresponds to the reference information and based on the result determine whether the video test automation has passed.

18 Claims, 12 Drawing Sheets

OPTICAL CHARACTER RECOGNITION FOR VIDEO AUTOMATION

CROSS REFERENCE TO RELATED APPLICATION

The present application is a continuation of U.S. patent application Ser. No. 13/615,979, filed on Sep. 14, 2012, issued on Apr. 14, 2015 as U.S. Pat. No. 9,009,261, and entitled "OPTICAL CHARACTER RECOGNITION FOR VIDEO AUTOMATION," the contents of which are hereby incorporated by reference in their entireties for all purposes.

BACKGROUND

Content providers such as Multi System Operators (MSOs) may employ optical character recognition (OCR) to test the performance of their content delivery networks (CDNs). For example, an MSO may employ an OCR test function to analyze the delivery of content to user devices such as client devices (e.g., display devices, computers, servers, smart phones, tablet computing devices, internet-enabled television sets). However, typical OCR test functions often produce unpredictable or inconsistent results when used in video or video on demand (VOD) test automation. In addition, typical OCR libraries and test functions may not support dynamic comparison of text and other data from multiple video frames. Furthermore, typical OCR test functions provide no mechanisms for controlling the execution time of test scripts.

One solution is to use indexed looping to run OCR multiple times in a loop (e.g., 5 times). However, this approach may result in an unacceptably low number of OCR comparisons producing expected results due to false matches and uncontrollable execution time. As a result, video test automation results may require human validation and, in some instances, video test automation efforts may become abandoned in favor of manual testing. This disclosure provides solutions for these and other issues.

SUMMARY

Some features described herein relate generally to a system that implements an information technique using a recognition process, such as an OCR process, that correlates information recognized by the system with reference information input by a user or determined by the system. In one aspect, the system may implement a system timer that allows for building a reference library with multiple recognized images. In some instances, the reliability of test script results may be improved using timer-based correlation. In another aspect, the system may implement a technique to determine performance information for testing any type of video signal, such as internet protocol (IP) video, non-IP video, and other video signals. Performance information may include, for example, content delivery performance information, video pump or video streamer performance information, or search result performance information.

In some embodiments, a computing device may receive information indicative of a time duration, information indicative of a region (e.g., a two-dimensional rectangular region, a two-dimensional non-rectangular region, a three-dimensional region, or any other region), and information indicative of data (e.g., a character, text string, icon or image) expected to appear in the indicated location and/or region of a screen snapshot during the indicated time duration. The screen snapshot may include data, for example, information indicative of one or more frames of a video and/or additional information such as one or more display screen overlays. In certain implementations, the computing device may capture the screen snapshot over the time duration and, in some instances, may correspond to two or more frames of a video. In some instances, data may include time information, position-related information and reference information received based on input from a user. In some instances, the computing device may determine the reference information based on recognized information for a plurality of display screen snapshots.

In some embodiments, the computing device may transmit an instruction to capture one or more screen snapshots during a particular time duration. For example, the computing device may transmit the instruction to a remote video server communicatively coupled to the computing device. Subsequently, the computing device may receive one or more captured screen snapshots. In some instances, the computing device may initiate a timer based on the time information, and capture the screen snapshots before the timer exceeds the time duration.

In some embodiments, the computing device may recognize information in a region of the display screen snapshot. For example, the computing device may use an OCR-based technique to recognize a text string in a region defined by the position-related information. The computing device may then determine whether the recognized information corresponds to reference information. If so, the computing device may terminate the instruction to capture additional display screen snapshots. If not, the computing device may process another snapshot until the recognized information corresponds to the reference information, or until the system time exceeds the time duration indicated by the time information.

This summary is not intended to identify critical or essential features of the disclosures herein, but instead merely summarizes some features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
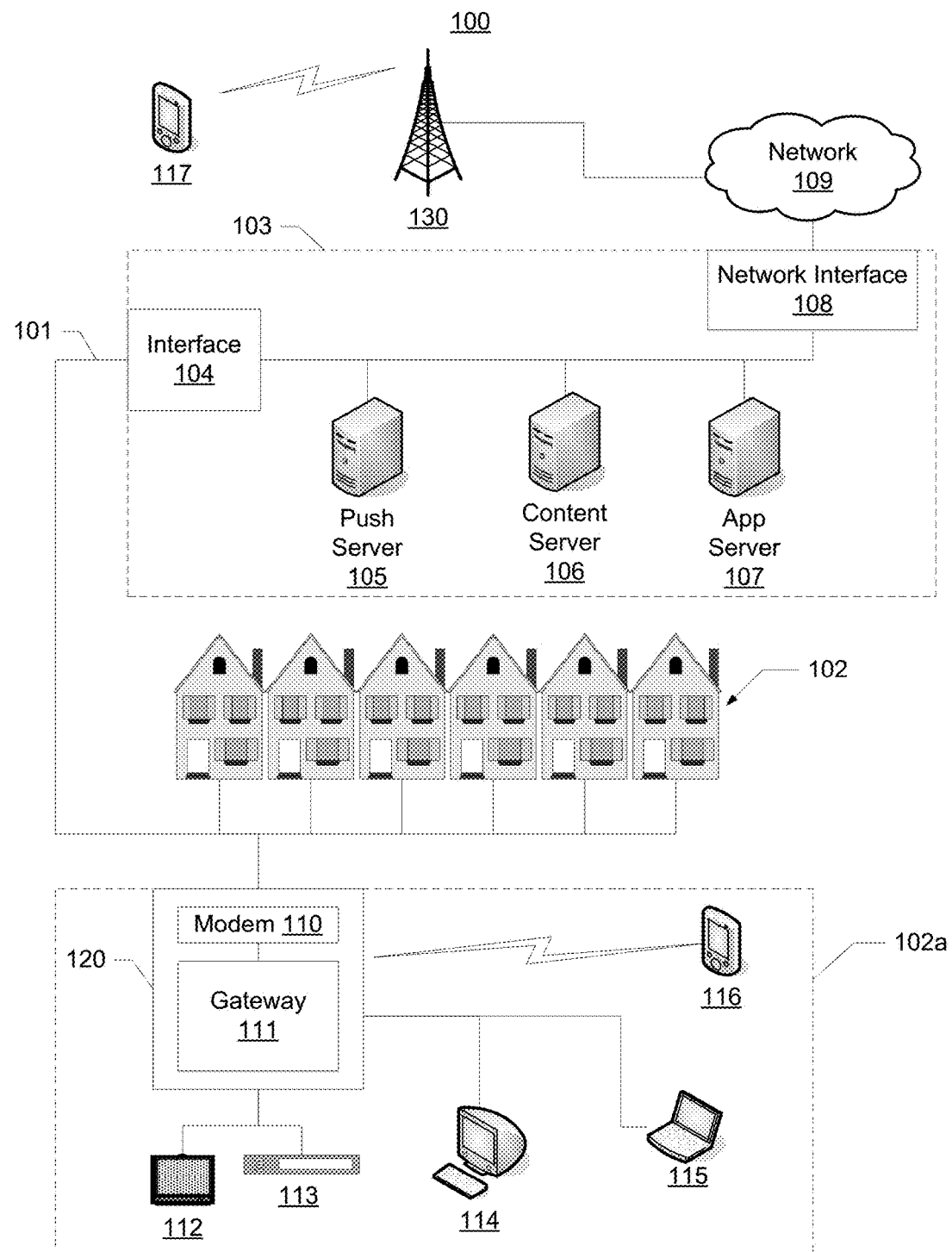
FIG. 1 illustrates an example network environment.

FIG. 1 illustrates an example information distribution network 100 in which many of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

Network 100 may be a telecommunications network, a multi-service operator (MSO) network, a cable television (CATV) network, a cellular network, a wireless network, an optical fiber network, a coaxial cable network, a hybrid fiber-coaxial (HFC) network, or any other type of information distribution network or combination of networks. For example, network 100 may be a cellular broadband network communicating with multiple communications access points, such as wireless communications tower 130, to provide communication signals to devices such as wireless device 117 (e.g., a mobile phone, a wireless laptop, a tablet computer, a portable gaming device). In another example, network 100 may be a coaxial system comprising a modem termination system (e.g., a cable mode termination system (CMTS)) communicating with numerous gateway interface devices (e.g., gateway interface device 111 in example home 102a). In another example, the network 100 may be a fiber-optic system comprising optical fibers extending from an optical line terminal (OLT) to numerous optical network terminals (ONTs) communicatively coupled with various gateway interface devices. In another example, the network 100 may be a digital subscriber line (DSL) system that includes local office 103 communicating with numerous gateway interface devices. In another example, network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

Network 100 may use a series of interconnected communication links 101 (e.g., coaxial cables, optical fibers, wireless links, etc.) to connect premises such as homes 102 or other user environments to local office 103. Communication links 101 may include any wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other components for communicating data. Data may include, for example, internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

Local office 103 may transmit downstream information signals onto communication links 101, and premises such as home 102 may receive and process those signals. In certain implementations, communication links 101 may originate from local office 103 as a single communications path, and may be split into any number of communication links to distribute data to homes 102 and various other destinations. Although the term home is used by way of example, homes 102 may include any type of user environment, such as single family homes, apartment complexes, businesses, schools, hospitals, parks, and other environments and combinations of environments.

Local office 103 may include interface 104, which may be a computing device configured to manage communications between devices on the network of communication links 101 and backend devices, such as server 105, server 106, and server 107. For example, interface 104 may be a cable modem termination system (CMTS). The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in homes 102, and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol networks, cellular communications networks (e.g., Global System for Mobile Communications (GSM), Code Division Multiple Access (CDMA), and any other 2nd, 3rd, 4th and higher generation cellular communications networks), cellular broadband networks, radio access networks, fiber-optic networks, local wireless networks (e.g., Wi-Fi, WiMAX), satellite networks, and any other networks or combinations of networks.

Local office 103 may include a variety of servers that may be configured to perform various functions. Local office 103 may include one or more push servers 105 for generating push notifications to deliver data, instructions, or both to devices that are configured to detect such notifications. Local office 103 may include one or more content servers 106 configured to provide content (e.g., media content) to devices. Local office 103 may include one or more application servers 107.

Homes 102 such as home 102a may include an interface 120, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other device or combination of devices. In certain implementations, device 110 may be a part of, or communicatively coupled to, gateway interface device 111. Gateway 111 may be, for example, a wireless router, a set-top box, a computer server, or any other computing device or combination.

Gateway interface device 111 may be any computing device for communicating with device 110 to allow one or more other devices in example home 102a to communicate with local office 103, one or more external networks 109, or other devices communicatively coupled thereto. Gateway 111 may include local network interfaces to provide communication signals to client devices in or near example home 102a, such as television 112, set-top box 113, personal computer 114, laptop computer 115, wireless device 116 (e.g., a wireless laptop, a tablet computer, a mobile phone, a portable gaming device), wireless device 117, a vehicular computing system (e.g., a mobile computing system, navigation system, or entertainment system in an automobile, marine vessel, or aircraft) and any other device.

Figure 2:
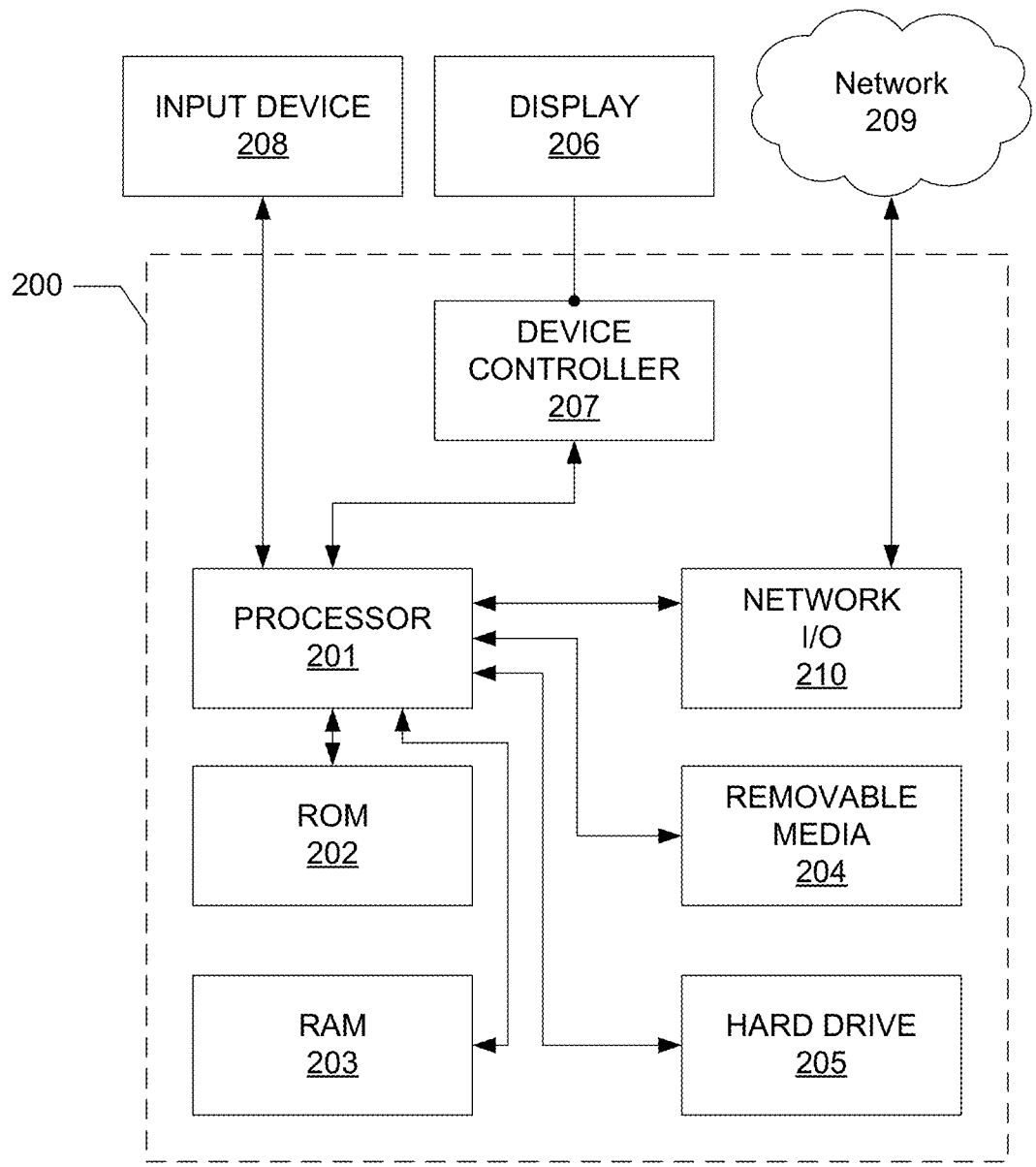
FIG. 2 illustrates an example software and hardware device on which various elements described herein can be implemented.

FIG. 2 illustrates general hardware elements and software elements that can be used to implement any of the various computing devices and/or software discussed herein. Device 200 may include one or more processors 201, which may execute instructions of a computer program to perform any of the functions and steps described herein. The instructions may be stored in any type of computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive.

Device 200 may include one or more output devices, such as a display 206 (e.g., external monitor, television), and may include one or more output device controllers 207, such as a video processor. In some embodiments, device 200 may include one or more user input devices 208, such as a remote control, keyboard, mouse, touch screen, microphone, or any other input device.

Device 200 may also include one or more network interfaces, such as network input/output (I/O) interface 210 to communicate with an external network 209. The network interface may be a wired interface, wireless interface, or a combination of the two. In some embodiments, network I/O interface 210 may include a cable modem, and network 209 may include the communication links 101 shown in FIG. 1, one or more external networks 109, an in-home network, a provider's wireless, coaxial, fiber, or hybrid fiber/coaxial distribution system (e.g., a DOCSIS network), or any other desired network.

Figure 3A:
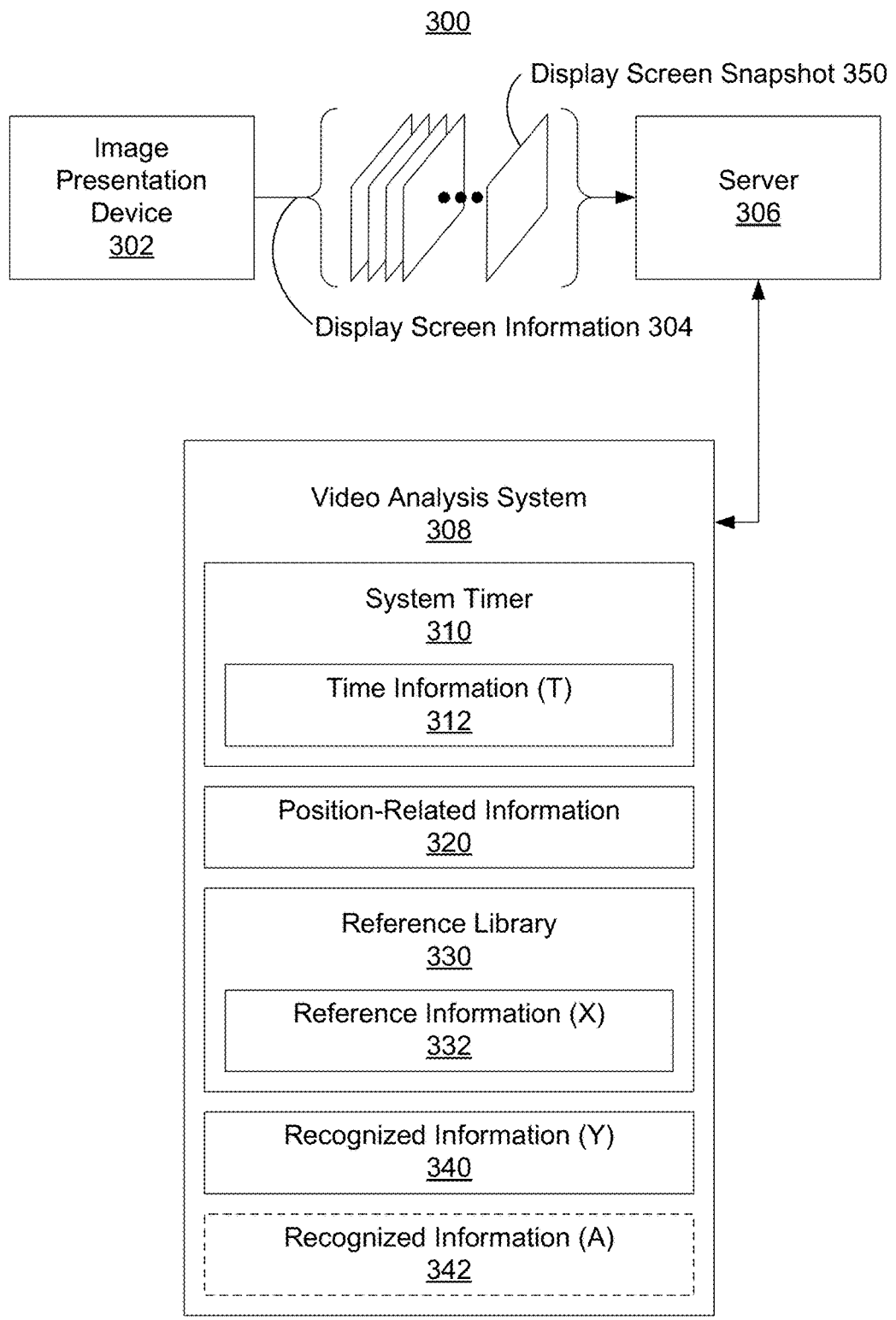
FIG. 3A illustrates an example system for providing video test automation.
Figure 3B:
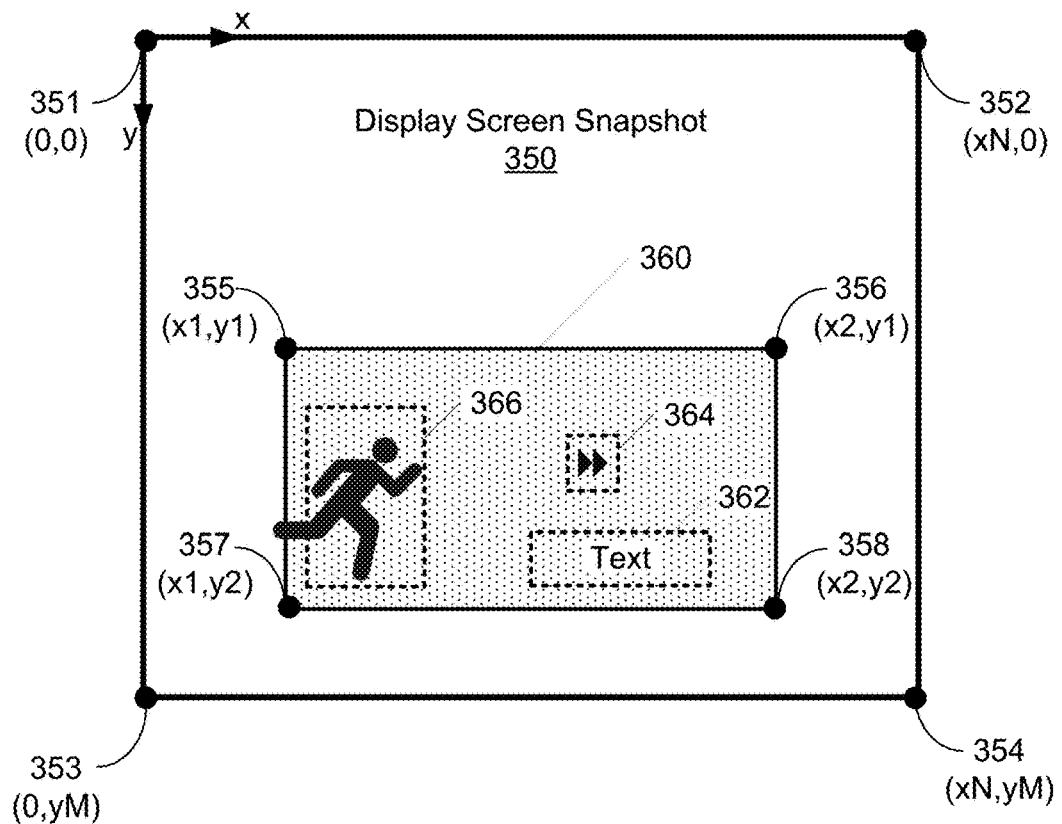
FIG. 3B illustrates an example display screen snapshot for use in providing the video test automation of FIG. 3A.

FIG. 3A illustrates an example system 300 for providing video test automation by processing one or more display screen snapshots, such as display screen snapshot 350, captured from an image presentation device such as image presentation device 302. An example display screen snapshot 350 is illustrated in FIG. 3B. In some instances, the video test technique described with reference to FIGS. 3A-3B may be referred to as an Optimized OCR for Video (oOCR-V) technique. In one instance, the oOCR-V technique may be used to compare screen text to a text string archived in a repository. In another instance, the oOCR-V technique may be used to dynamically compare two text strings on different video display screens or frames.

The various features shown in FIGS. 3A-3B may be implemented using hardware, software, or both, such as device 200 shown in FIG. 2, and may be communicatively coupled using any communications links, such as wired or wireless communications links 101 shown in FIG. 1. In some aspects, the physical arrangement of the components in system 300 may be different than the arrangements shown in FIGS. 3A-3B. For example, each of the components may be coupled through one or more communications networks, such as one or more external networks 109 shown in FIG. 1, via, for example, a respective router.

System 300 may include image presentation device 302, server 306, and video analysis system 308. Image presentation device 302 may be, for example, a computing device configured to render, process and/or present video and other data. For example, image presentation device 302 may be an image presentation device such as television 112, set-top box 113, personal computer 114, laptop computer 115, wireless device 116, or any other device. Server 306 may be, for example, a computing device such as a video server for capturing, receiving and processing display screen information 304. Display screen information 304 may include information indicative of one or more captured display screen snapshots. A display screen snapshot may include, for example, information indicative of a frame of video and any additional information (e.g., characters, text strings, icons, images, advertisements, frames of other videos, etc.) overlaid on top of, behind or adjacent to the video frame. For example, server 306 may capture a display screen snapshot from a data stream destined for a display screen associated with image presentation device 302. In some instances, a display screen snapshot may include or be tagged with metadata. For example, the metadata may represent the time at which the display screen snapshot was captured. Display screen snapshots will be discussed in further detail with reference to FIG. 3B.

Video analysis system 308 may include hardware and/or software for performing video test automation based on display screen information 304 and may be implemented using, for example, one or more computing devices such as application servers. For example, video analysis system 308 may provide video test automation using system timer 310, time information 312, position-related information 320 such as coordinate information, reference library 330, reference information 332 and recognized (e.g., via determination or analysis) information 340.

System timer 310 may be, for example, a hardware or software timer and may include comparison logic to compare a system time against a time value or duration indicated by time information 312. Time information 312 may include, for example, a predetermined time value or duration (e.g., T=5 seconds) that indicates the duration of the snapshot capturing process of the video test automation. In some instances, time information 312 may be input by a user using an input device such as input device 208 shown in FIG. 2. For example, time information 312 may be hard-coded into a script or may be a variable read into the script from, for example, an Extensible Markup Language (XML) file.

Position-related information 320 may be, for example, a predetermined set of coordinates that indicate locations and/or boundaries of a region of a display screen snapshot to be processed by video analysis system 308 during the video test automation. For example, position-related information 320 may include a set of coordinates indicative of a two-dimensional region such as a two-dimensional rectangular region (e.g., (x1,x2,y1,y2)=(50,200,50,100)). In another example, position-related information 320 may include a set of coordinates indicative of a three-dimensional region. In some instances, position-related information 320 may be input by a user using an input device. For example, position-related information 320 may be hard-coded into a script or may be a variable read into the script from, for example, an XML file. For purposes of illustration and not of limitation, aspects of the disclosure will be discussed herein with reference to a two-dimensional Cartesian coordinate system.

Reference library 330 may be, for example, a storage device or database that includes reference information 332 and additional reference information. Reference information 332 may include, for example, a predetermined character, location, text string, icon or image. Video analysis system 308 may use reference information 332 to test for information that is expected to appear during the video test automation (e.g., the information for which video analysis system 308 is testing). In some embodiments, reference information 332 may be input by a user using an input device. For example, reference information 332 may be hard-coded into a script or may be one or more variables read into the script from, for example, one or more XML files. In some embodiments, reference information 332 may be determined by video analysis system 308, which is discussed in further detail with reference to FIGS. 5A-5C.

Video analysis system 308 may use time information 312, position-related information 320, and reference information 332, alone or in combination, to poll for information in display screen snapshots captured from image presentation device 302. For example, video analysis system 308 may test for the appearance of reference information 332 in the region indicated by position-related information 320 during the time duration indicated by time information 312.

In response to receiving information 312, 320 and 332, video analysis system 308 may initiate system timer 310 and transmit, to server 306, an instruction to capture display screen snapshots during the time duration indicated by time information 312. Server 306 may receive display screen information 304 that includes one or more captured display screen snapshots. For example, server 306 may receive information 304 that includes snapshots captured at a rate of 30 snapshots per second. Server 306 may individually process and transmit each display screen snapshot to video analysis system 308. In some instances, video analysis system 308 may transmit an instruction to server 306 to capture and transmit as many display screen snapshots as possible during the indicated time duration without performing counting operations.

Video analysis system 308 may use a recognition technique to recognize information that appears in the region defined by position-related information 320 for one or more display screen snapshots received from video server 306 (e.g., before the entire capture process is completed). Recognized information may include one or more characters, text strings, icons, objects or images. Recognition techniques may include, for example, OCR (e.g., an OCR-based comparison or correlation function), color correlation (e.g., a matrix-based RGB color comparison technique), shape correlation, bitmap correlation, or other text or image recognition techniques. In some instances, the recognition technique may include positioning each captured display screen snapshot onto a web page for use in performing a web page-based text or image recognition technique. Video analysis system 308 may store the recognized information as recognized information 340 in reference library 330.

Video analysis system 308 may determine whether the video test automation has passed or failed by, for example, determining whether recognized information 340 corresponds to reference information 332. For example, video analysis system 308 may determine that a recognized text string Y=Text corresponds to a reference text string X=Text because they include identical information. In another example, video analysis system 308 may perform a cross-correlation of recognized information 340 and reference information 332 and compare the cross-correlation result to a predetermined threshold value (e.g., 0.6). If the cross-correlation result is equal to or beyond the threshold value, video analysis system 308 may determine that recognized information 340 corresponds to reference information 332. If it is determined that recognized information 340 corresponds to reference information 332, video analysis system 308 may determine that the video test automation has passed and terminate the instruction to capture the display screen snapshots. For example, video analysis system 308 may break the system-level polling for information process by stopping the timer and exiting out of the display screen capture loop.

In some embodiments, video analysis system 308 may determine performance information by determining the time taken for reference information 332 to appear in one of the display screen snapshots. For example, video analysis system 308 may determine content delivery performance information, video pump or video streamer performance information (e.g., for testing video on demand (VOD) processes), or search result performance information.

In one aspect, video analysis system 308 may determine content delivery performance information for a content delivery network that provides display screen information to the device, such as network 100 shown in FIG. 1. For example, video analysis system 308 may compare the time at which reference information 332 is expected to appear against the time that reference information 332 actually appears to determine the latency of the content delivery network. Other network performance characteristics may be evaluated by the methods discussed herein.

In another aspect, video analysis system 308 may determine video pump (or video streamer) performance information corresponding to a video data stream transmitted from a device in response, for example, to image presentation device 302 initiating a fast forward sequence. For example, video analysis system may compare two display screen snapshots in a fast forward sequence to determine whether the expected fast forward amount corresponds to the fast forward amount indicated by recognized information 340. For example, a first display screen snapshot may include the text string "00:00:10" (e.g., corresponding to 10 seconds in an HH:MM:SS format) and a fast forward icon indicating that a fast forward sequence has been initiated. Based on the fast forward speed, a second display screen snapshot captured 10 seconds later may be expected to include the text string "00:01:00" but may actually include the text string "00:01:05". As a result, video analysis system 308 may determine that there is a five second error for every minute of fast forwarded video. In some instances, video pump performance information may include performance information for other processes such as video on demand transmission, rewind, skip, seek, pause, slow-motion, and other trick play processes.

In another aspect, video analysis system 308 may determine search result performance information for a search initiated by a user using an input device coupled to image presentation device 302. For example, a display screen snapshot may include a list of media content search results (e.g., corresponding to media assets such as video assets, movies, television episodes, audio assets, biographical information, etc.) provided in response to a user inputting the search string (e.g. an actor name, a movie title, etc.) in a search box included in the display screen snapshot. Video analysis system 308 may recognize and compare the search results against data expected to be displayed in response to the search. For example, the system may determine that an error has occurred if five search results are expected for a particular search string but only four search results are included in the display screen snapshot.

As illustrated in FIG. 3B, a position-related system in the form of a coordinate system may represent positions and regions associated with a display screen snapshot 350. The coordinate system may be Cartesian, polar, or any other coordinate or reference system. Examples described herein refer to a Cartesian coordinate system as an illustration, and in a non-limiting fashion.

Points 351, 352, 353, and 354 may indicate boundaries associated with snapshot 350 in accordance with the coordinate system. For example, point 351 may represent the (x,y) position (0,0), which may be the most top left point or pixel of snapshot 350. Point 352 may represent the (x,y) position (xN,0), which may be the most top right point or pixel of snapshot 350. Point 353 may represent the (x,y) position (0,yM), which may be the most bottom left point or pixel of snapshot 350. Point 354 may represent the (x,y) position (xN,yM), which may be the most bottom right point or pixel of snapshot 350. The coordinate system described above is merely an illustrative example and, in another coordinate system, for example, the center of snapshot 350 may correspond to the (x,y) position (0,0).

Points 355, 356, 357, and 358 may define the boundaries of region 360 (e.g., the region to be analyzed by video analysis system 308) in accordance with the coordinate system and position-related information 320. For example, point 355 may represent the (x,y) position (x1,y1), where x1 is a value greater than or equal to 0 but less than xN, and where y1 is a value greater than or equal to 0 but less than yM. Point 355 may be the most top left point or pixel of region 360. Point 356 may represent the (x,y) position (x2,y1), where x2 is a value greater than x1 but less than or equal to xN. Point 356 may be the most top right point or pixel of region 360. Point 357 may represent the (x,y) position (x1,y2), where y2 is a value greater than y1 but less than or equal to yM. Point 357 may be the most bottom left point or pixel of region 360. Point 358 may represent the (x,y) position (x2,y2), which may be the most bottom right point or pixel of region 360. In some instances, region 360 may be static with respect to the boundaries of snapshot 350 (e.g., similar to a display screen overlay).

Region 360 may include information such as text string 362 (e.g., "Text"), icon 364 (e.g., a fast forward icon, a company logo), image 366 (e.g., a moving object such as a person), or other data. Video analysis system 308 may recognize one or more of string 362, icon 364, image 366 or other data and store them as recognized information 340. In some instances, one or more of string 362, icon 364 and image 366 may be stored as recognized information 342 and used to determine reference information 332.

Figure 4A:
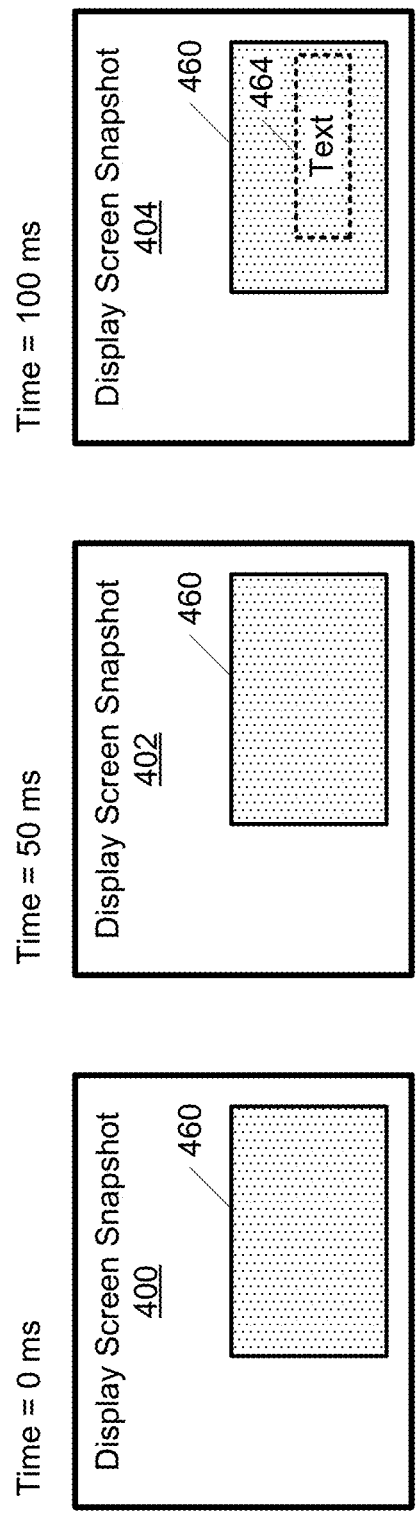
FIGS. 4A-4B illustrates an example video test technique.
Figure 4B:
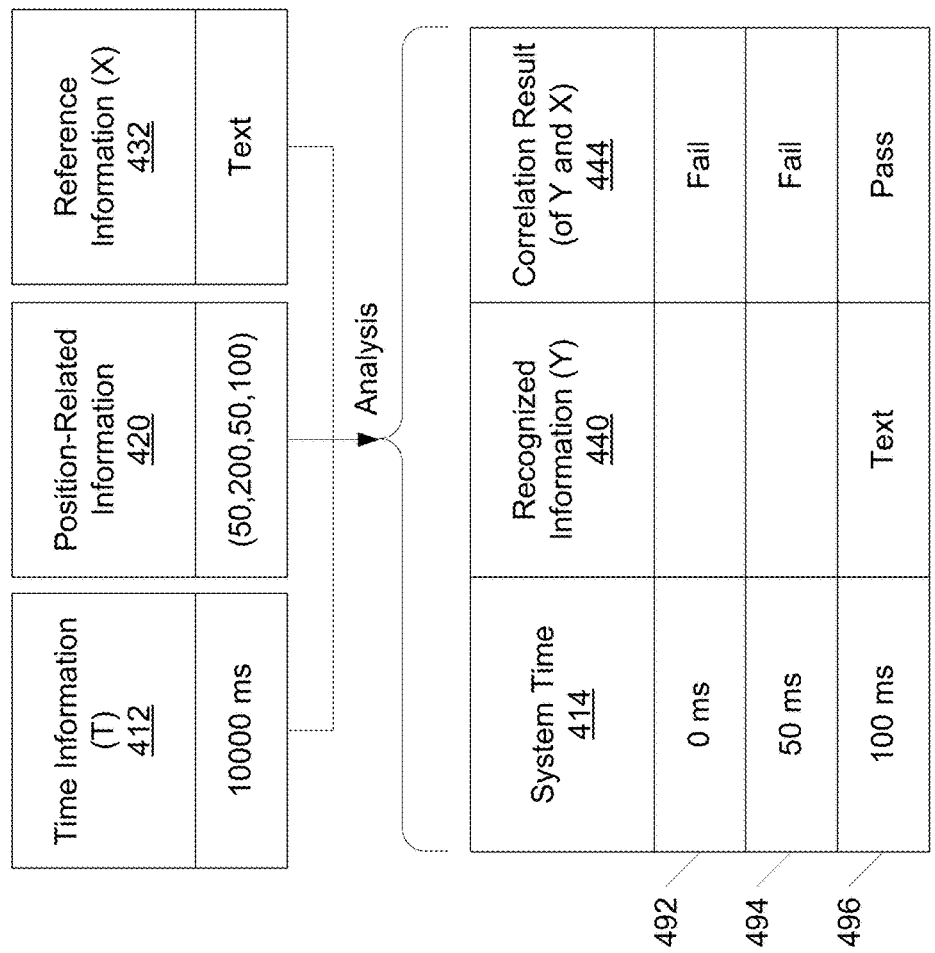

FIGS. 4A-4B illustrate an example video test technique using a poll for information technique. As shown in FIG. 4B, the video analysis system (e.g., video analysis system 308 shown in FIG. 3A) may receive time information 412 (e.g., T=10000 milliseconds), position-related information 420 (e.g., (x1,x2,y1,y2)=(50,200,50,100)), and reference information 432 (e.g., X=Text). The video analysis system may transmit an instruction (e.g., to server 306) to capture display screen snapshots from an image presentation device (e.g., image presentation device 302) during the time duration indicated by time information 412 (e.g., at a rate of 20 snapshots per second). The video analysis system may initiate or reset system time 414 so that a system time of 0 milliseconds corresponds to the start of the display screen capture process.

As shown in FIG. 4A and row 492 of FIG. 4B, the video analysis system may receive display screen snapshot 400 captured at a system time of 0 milliseconds. The video analysis system may process display screen snapshot 400 and determine that no text is recognized in region 460. As a result, the video analysis system may store an empty or null value as recognized information 440 (e.g., Y=). The video analysis system may compare recognized information 440 against reference information 432 and determine that they do not correspond because an empty or null value does not correspond to the reference text string "Text". The video analysis system may determine a correlation result 444 (e.g., a flag or text string) of "fail" and, if system time 414 is not beyond the time duration indicated by time information 412, process another display screen snapshot.

As shown in FIG. 4A and row 494 of FIG. 4B, the video analysis system may receive display screen snapshot 402 captured at a system time of 50 milliseconds. The video analysis system may process display screen snapshot 402 and determine that no text is recognized in region 460. As a result, the video analysis system may store an empty or null value as recognized information 440 (e.g., Y=). The video analysis system may compare recognized information 440 against reference information 432, determine that they do not correspond and determine a correlation result 444 of "fail". If system time 414 is still not beyond the time duration indicated by time information 412, the video analysis system may process another display screen snapshot.

As shown in FIG. 4A and row 496 of FIG. 4B, the video analysis system may receive display screen snapshot 404 captured at system time 414 (e.g., 100 milliseconds). The video analysis system may process display screen snapshot 404 and recognize the text string "Text" in region 460. As a result, the video analysis system may store the recognized text string as recognized information 440 (e.g., Y=Text). The video analysis system may compare recognized information 440 against reference information 432 and determine that they correspond because the recognized text string "Text" corresponds to the reference text string "Text". The video analysis system may determine a correlation result 444 of "pass" and terminate the instruction to capture the display screen snapshots. As a result, the display screen capture process may be completed before system time 414 has reached the time duration indicated by time information 412.

Figure 5A:
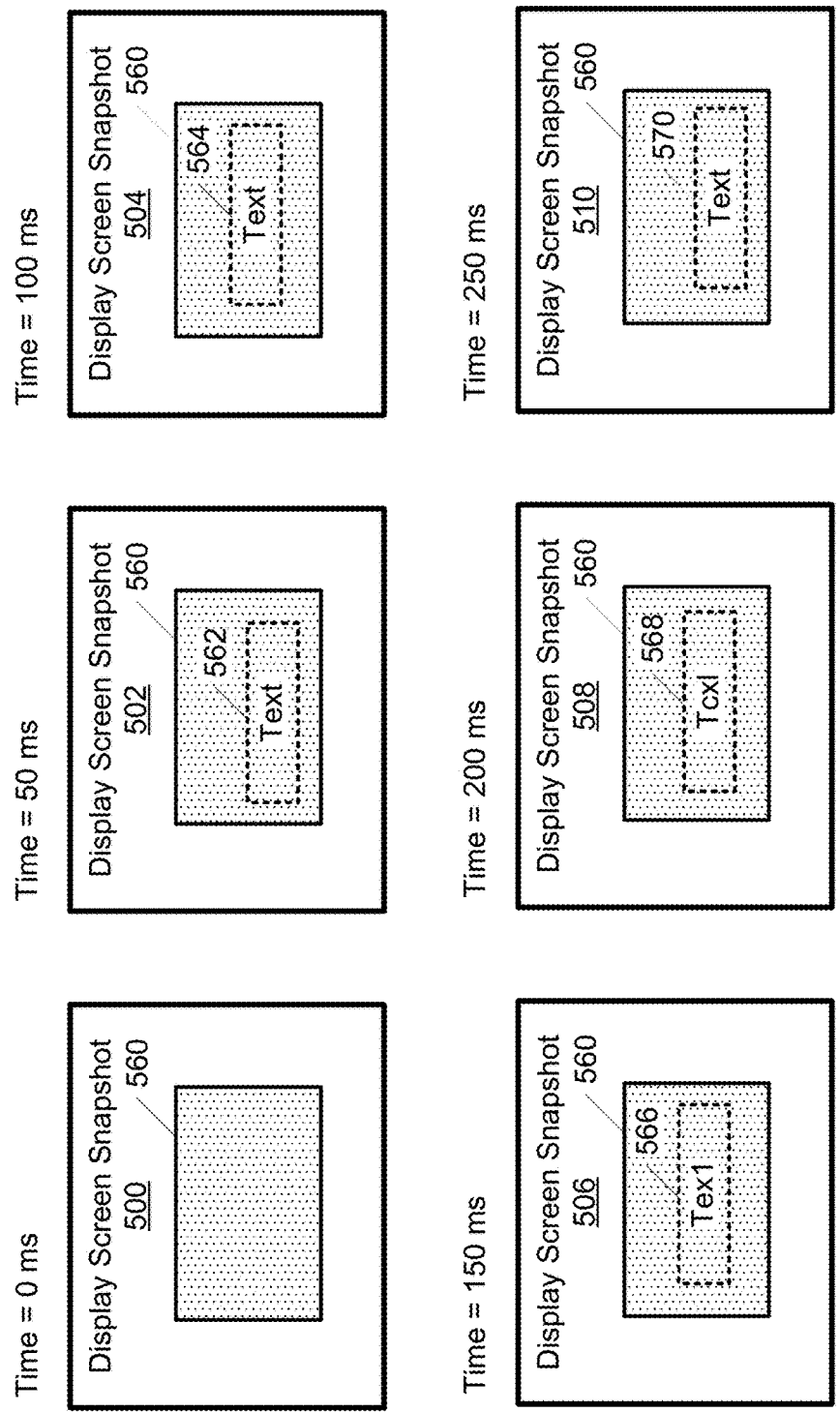
FIGS. 5A-5C illustrate another example video test technique.
Figure 5B:
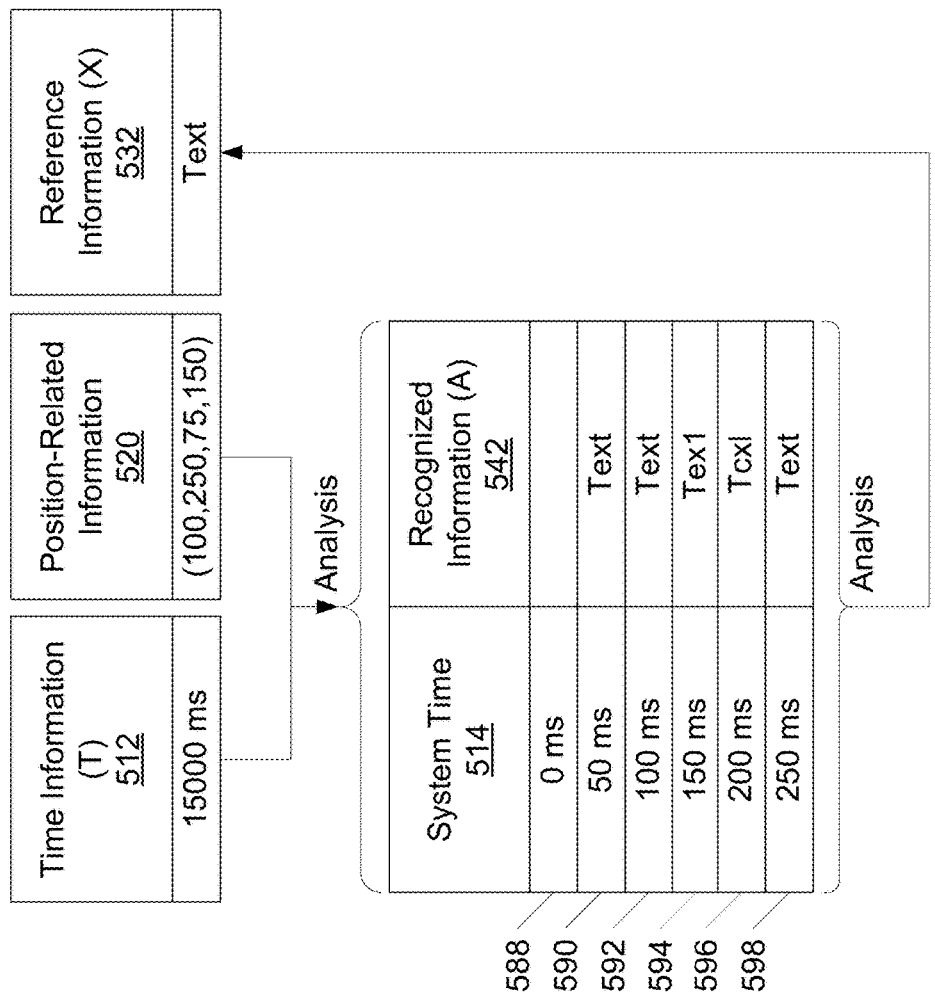
Figure 5C:
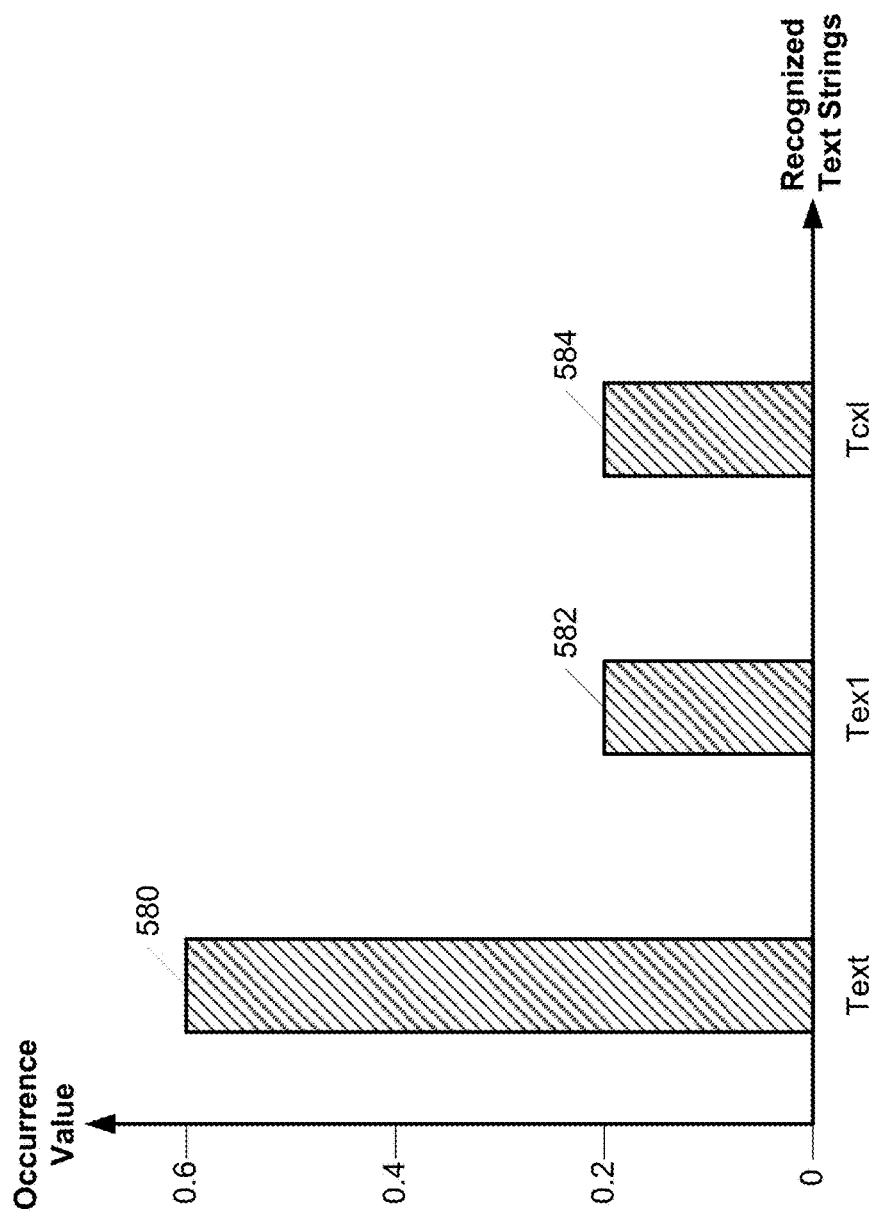

FIGS. 5A-5C illustrate an example video test technique using a dynamic poll technique to determine reference information. As shown in FIG. 5B, the video analysis system may receive time information 512 (e.g., T=15000 milliseconds) and position-related information 520 (e.g., (x3,x4,y3,y4)=(100,250,75,150)) to dynamically poll for information in display screen snapshots captured from an image presentation device (e.g., image presentation device 302). The video analysis system may transmit an instruction to capture screen snapshots from the device during the time duration indicated by time information 512. The video analysis system may initiate or reset system time 514 so that a system time of 0 milliseconds corresponds to the start of the display screen capture process.

As shown in FIG. 5A and rows 588, 590, 592, 594, 596 and 598 of FIG. 5B, the video analysis system may receive display screen snapshots 500, 502, 504, 506, 508 and 510 respectively captured at system times of 0, 50, 100, 150, 200 and 250 milliseconds. The video analysis system may use a recognition technique to recognize information that appears in region 560 (e.g., the region defined by the position-related information 520) of each display screen snapshot. For example, the video analysis system may process the display screen snapshots and determine that: no text is recognized in region 560 of snapshot 500, the text string "Text" is recognized in region 560 of snapshot 502; the text string "Text" is recognized in region 560 of snapshot 504; the text string "Tex1" is recognized in region 560 of snapshot 506; the text string "Tcx1" is recognized in region 560 of snapshot 508; and the text string "Text" is recognized in region 560 of snapshot 510. The video analysis system may store the information as recognized information 542 as shown in FIG. 5B. In some embodiments, recognized information 542 may be stored as an array, such as the array A={;Text;Text;Tex1;Tcx1;Text}.

As shown in FIG. 5C, the video analysis system may determine one or more occurrence values (e.g., occurrence values 580, 582 and 584) for the recognized text strings in information 542 shown in FIG. 5B. An occurrence value may be, for example, the number of occurrences of particular information in recognized information 542 divided by the total number of information in recognized information 542. For example, the recognized text string "Text" may have an occurrence value 580 of 0.6 based on it occurring three times out of a total of five recognized text strings. The recognized text string "Tex1" may have an occurrence value 582 of 0.2 based on it occurring one time out of a total of five recognized text strings. The recognized text string "Tcx1" may have an occurrence value 584 of 0.2 based on it occurring one time out of a total of five recognized text strings.

In some embodiments, the video analysis system may select the recognized text string having the greatest occurrence value equal to or beyond a predetermined threshold value (e.g., 0.6) and store it as reference information. For example, the video analysis system may select the text string "Text" in recognized information 542 and store it as reference information 540 because its occurrence value 580 (i.e., 0.6) is the greatest and because it is equal to a predetermined threshold value of 0.6. In some instances, if the greatest occurrence value is not beyond the predetermined threshold value, the video analysis system may process additional display screen snapshots until recognized information 542 includes information that has an occurrence value equal to or beyond the predetermined threshold value. In some instances, if the greatest occurrence value never exceeds the predetermined threshold value, the video analysis system may determine that the process has failed and terminate the analysis.

Figure 6:
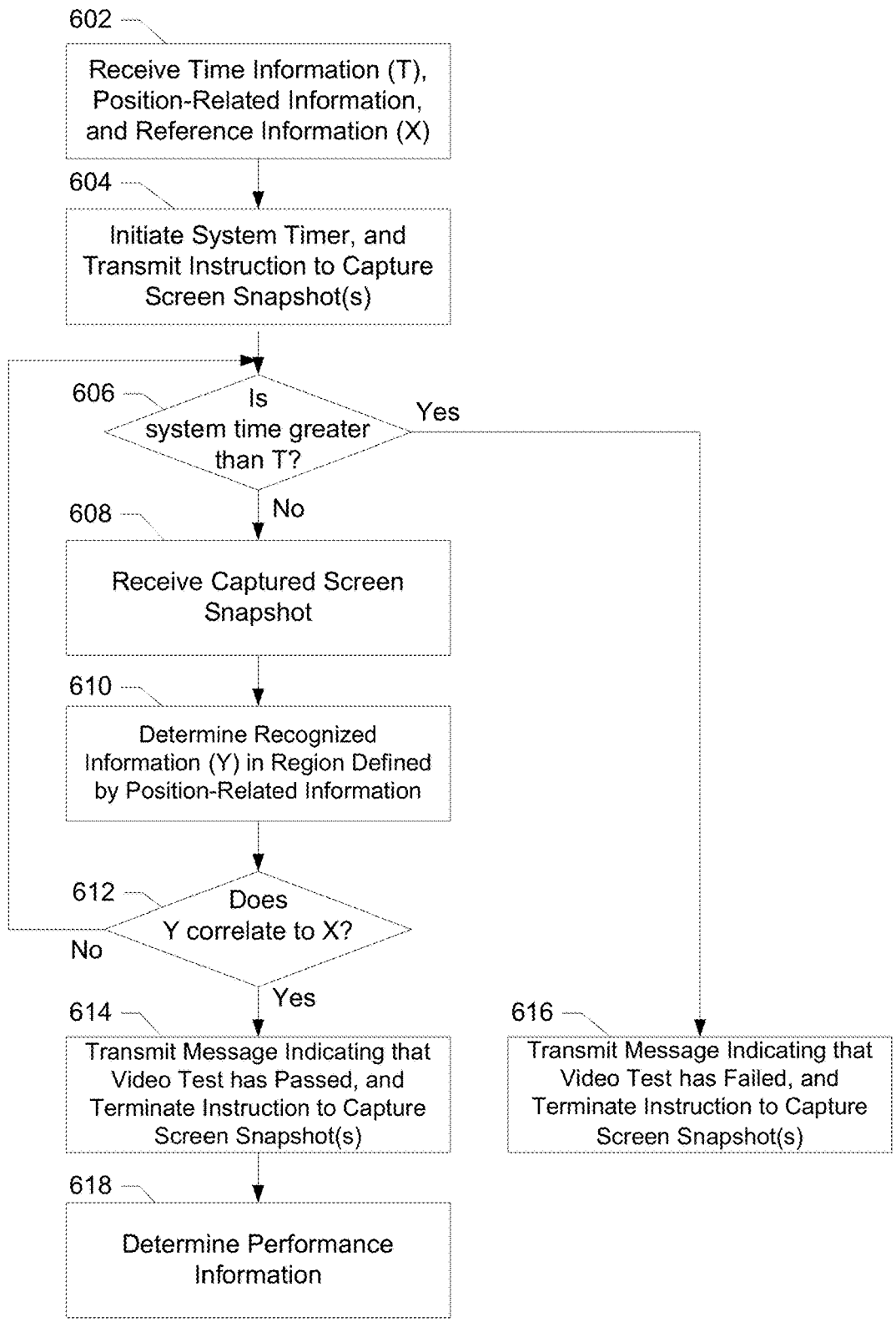
FIG. 6 illustrates an example process flow for providing video test automation.

FIG. 6 illustrates an example process flow for providing video test automation using an information such as techniques described with reference to FIGS. 3A-3B and FIGS. 4A-4B. Although the steps are described with reference to a video analysis system, different steps may be implemented using any component or combination of components, such as components described with reference to FIGS. 1-3A.

At step 602, the video analysis system (e.g., video analysis system 308) receives time information (e.g., information 312, 412), position-related information (e.g., information 320, 420) and reference information (e.g., information 332, information 432). The time information may include, for example, a value indicative of a time duration (e.g., T=10 seconds). The position-related information may include, for example, a set of coordinates indicative of a two-dimensional rectangular region (e.g., (x1,x2,y1,y2)=(50,200,50, 100)), a non-rectangular region, a 3-D region, or any other information. The reference information may include, for example, a text string (e.g., X=Text) that is expected to appear during the video test automation. In some embodiments, the reference information may be input by a user using an input device (e.g., device 208 shown in FIG. 2). In some embodiments, the video analysis system may determine the reference information as discussed with reference to FIGS. 5A-5C and FIG. 7A.

At step 604, the video analysis system initiates a system timer (e.g., timer 310) and transmits an instruction to capture one or more display screen snapshots during the time duration indicated by the time information. The video analysis system may initiate or reset the system time (e.g., time 414) so that the system time corresponds to, for example, 0 milliseconds. The video analysis system may transmit the instruction to, for example, a computing device such as server 306.

At step 606, the video analysis system determines whether the system time is greater than the time duration indicated by the time information. If the system time is not greater than the indicated time duration, the process may proceed to step 608. If the system time is greater than the indicated time duration, the process may proceed to step 618.

At step 608, the video analysis system receives information indicative of a captured screen snapshot (e.g., snapshot 350, 400, 402, 404). In some embodiments, the video analysis system may receive the captured screen snapshot in response to transmitting the instruction to capture the one or more display screen snapshots.

At step 610, the video analysis system determines recognized information (e.g., information 340, 440) in a region (e.g., region 360, 460) of the display screen snapshot defined by the position-related information. The video analysis system may recognize information using, for example, the recognition techniques described with reference to FIGS. 3A-3B and FIGS. 4A-4B.

At step 612, the video analysis system may determine whether the recognized information correlates to the reference information. For example, the video analysis system may determine whether the recognized information correlates to the reference information using the techniques described with reference to FIGS. 3A-3B and FIGS. 4A-4B. If the recognized information does not correlate to the reference information, the process may return to step 606 for processing another display screen snapshot if the system time is not greater than the time duration indicated by the time information. If the recognized information correlates to the reference information, the process may proceed to step 614

At step 614, the video analysis system transmits a message indicating that the video test has passed and terminates the instruction to capture the one or more display screen snapshots. For example, the video analysis system may transmit a message indicating that the video test has passed and terminate the instruction to capture the one or more display screen snapshots when the reference information is determined to correspond to the reference information.

At step 616, the video analysis system determines performance information. The video analysis system may determine performance information using, for example, the techniques described with reference to FIG. 3A. In some instances, the video analysis system may determine the performance information after step 612 and before step 614.

At step 618, the video analysis system transmits a message indicating that the video test has failed and terminates the instruction to capture the one or more display screen snapshots. For example, the video analysis system may transmit a message indicating that the video test has failed and terminate the instruction to capture the one or more display screen snapshots when the recognized information does not correspond to the reference information and the system timer is greater than the time duration indicated by the time information.

Figure 7A:
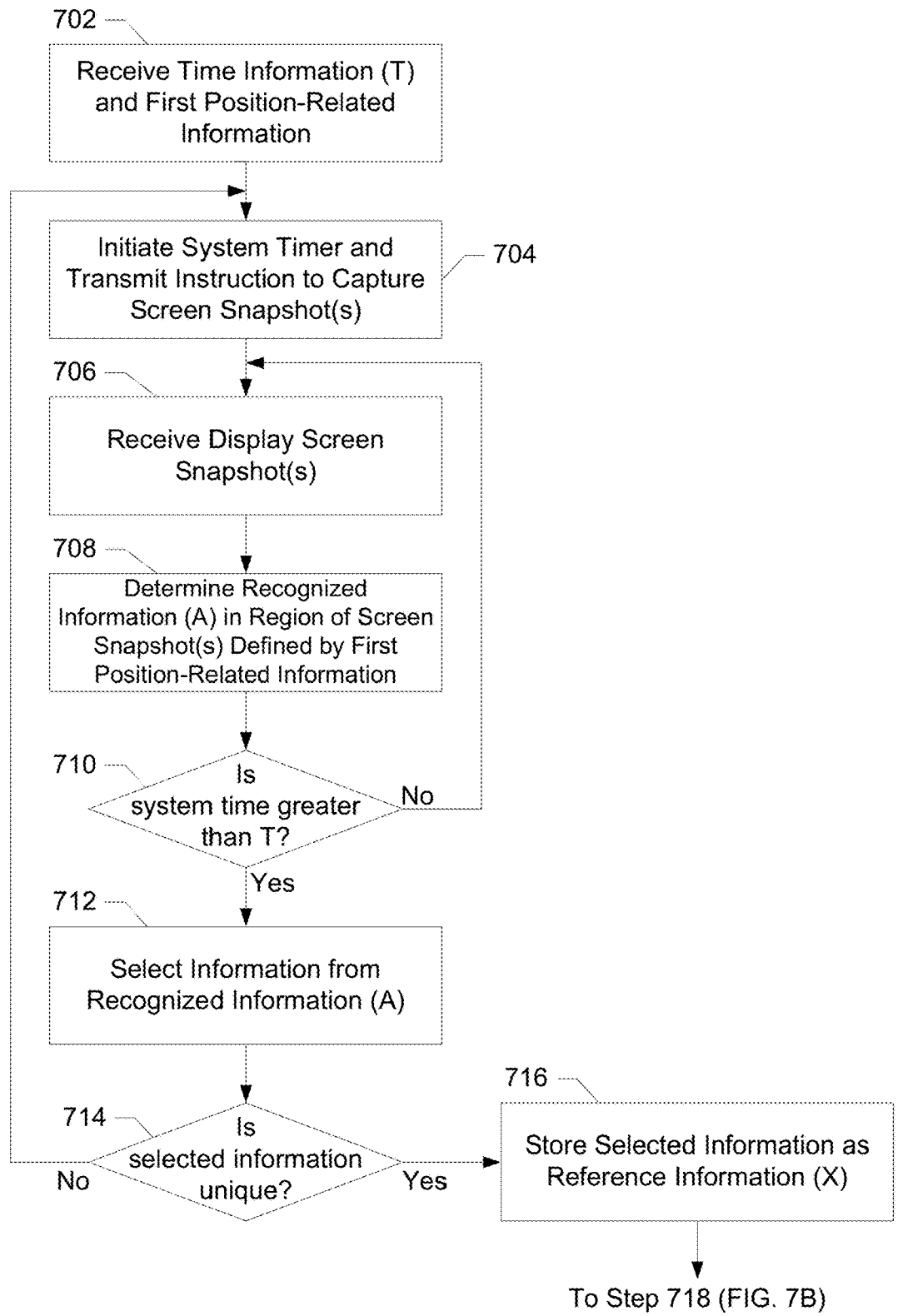
FIGS. 7A-7B illustrate another example process flow for providing video test automation.
Figure 7B:
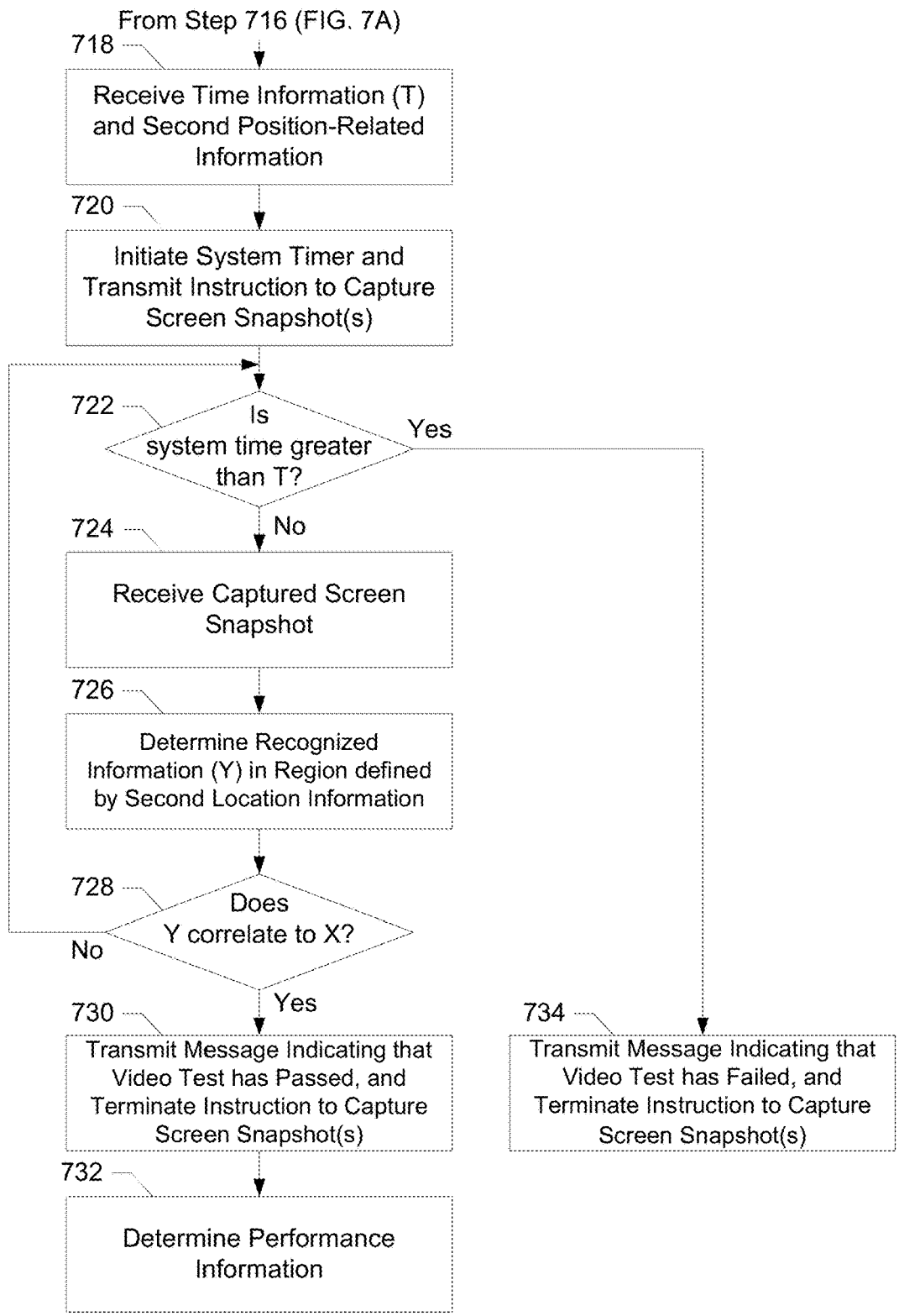

FIGS. 7A-7B illustrates another example process flow for providing video test automation.

FIG. 7A illustrates an example process flow for determining reference information using a technique such as the dynamic poll for information technique described with reference to FIGS. 3A-3B and FIGS. 5A-5C. Although the steps are described with reference to a video analysis system, different steps may be implemented using any component or combination of components, such as components described with reference to FIGS. 1-3A.

At step 702, the video analysis system (e.g., video analysis system 308) receives time information (e.g., information 312, 512) and first position-related information (e.g., information 320, 520). The time information may include, for example, a value indicative of a time duration (e.g., T=15 seconds). The first position-related information may include, for example, a first set of coordinates indicative of a first two-dimensional rectangular region (e.g., (x1,x2,y1,y2)= (100,250,75,150)), a first non-rectangular region, a first 3-D region, or any other information.

At step 704, the video analysis system initiates a system timer (e.g., timer 310) and transmits an instruction to capture one or more display screen snapshots during the time duration indicated by the time information. The video analysis system may initiate or reset the system time (e.g., time 514) so that the system time corresponds to, for example, 0 milliseconds. The video analysis system may transmit the instruction to, for example, a computing device such as server 306.

At step 706, the video analysis system receives one or more captured display screen snapshots (e.g., snapshots 350, 500, 502, 504, 506, 508, 510). In some embodiments, the video analysis system may receive the one or more display screen snapshots in response to transmitting the instruction to capture the one or more display screen snapshots.

At step 708, the video analysis system determines recognized information (e.g., information 342, 542) in a region (e.g., region 360, 560) of the display screen snapshot defined by the first position-related information. The video analysis system may recognize information using, for example, the recognition techniques described with reference to FIGS. 3A-3B and FIGS. 5A-5C.

At step 710, the video analysis system determines whether the system time is greater than the time duration indicated by the time information. If the system time is not greater than the indicated time duration, the process may return to step 706 for processing another display screen snapshot. If the system time is greater than the indicated time duration, the process may proceed to step 712.

At step 712, the video analysis system selects information from the recognized information. For example, the video analysis system may select the information with the greatest occurrence value as described with reference to FIGS. 5A-5C.

At step 714, the video analysis system determines whether the selected information is unique. For example, the video analysis system may determine whether the selected information is unique by determining whether the occurrence value of the selected information is equal to or beyond a predetermined threshold value as described with reference to FIGS. 5A-5C. In another example, the video analysis system may determine that the selected information is not unique if its occurrence value is equal to another occurrence value (e.g., such as a tie between the occurrence values of two recognized text strings). If the selected information is unique, the process may proceed to step 716. If the selected information is not unique, the process may return to step 704 and the system timer may be re-initiated.

At step 716, the video analysis system stores the selected information as reference information (e.g., information 340, 440, 540). For example, the video analysis system may store the selected information as reference information in a reference library (e.g., library 330). After step 716, the process may proceed to step 718, which is discussed with reference to FIG. 7B.

FIG. 7B illustrates an example process flow for recognizing information and correlating the recognized information with the determined reference information using a technique such as the poll for information technique described with reference to FIGS. 3A-3B and FIGS. 4A-4B. Although the steps are described with reference to a video analysis system, different steps may be implemented using any component or combination of components, such as components described with reference to FIGS. 1-3A.

At step 718, the video analysis system (e.g., video analysis system 308) receives time information (e.g., information 312, 412) and second position-related information (e.g., information 320, 420) such as coordinate information). The time information may include, for example, a value indicative of a time duration (e.g., T=10 seconds). The second position-related information may include, for example, a second set of coordinates indicative of a second two-dimensional rectangular region (e.g., (x3,x4,y3,y4)=(50,200,20, 100)), a second non-rectangular region, a second 3-D region, or any other information.

At step 720, the video analysis system initiates a system timer (e.g., timer 310) and transmits an instruction to capture one or more display screen snapshots during the time duration indicated by the time information. The video analysis system may initiate or reset the system time (e.g., time 414) so that the system time corresponds to, for example, 0 milliseconds. The video analysis system may transmit the instruction to, for example, a computing device such as server 306.

At step 722, the video analysis system determines whether the system time is greater than the time duration indicated by the time information. If the system time is not greater than the indicated time duration, the process may proceed to step 724. If the system time is greater than the indicated time duration, the process may proceed to step 734.

At step 724, the video analysis system receives information indicative of a captured screen snapshot (e.g., snapshot 350, 400, 402, 404). In some embodiments, the video analysis system may receive the captured screen snapshot in response to transmitting the instruction to capture the one or more display screen snapshots.

At step 726, the video analysis system determines recognized information (e.g., information 340, 440) in a region (e.g., region 360, 460) of the display screen snapshot defined by the position-related information. The video analysis system may recognize information using, for example, the recognition techniques described with reference to FIGS. 3A-3B and FIGS. 4A-4B.

At step 728, the video analysis system determines whether the recognized information correlates to the reference information (e.g., the reference information stored at step 716) using, for example, the techniques described with reference to FIGS. 3A-3B and FIGS. 4A-4B. If the recognized information does not correlate to the reference information, and if the system time is not greater than the time duration indicated by the time information, the process may return to step 722 for processing another display screen snapshot. If the recognized information correlates to the reference information, the process may proceed to step 730.

At step 730, the video analysis system transmits a message indicating that the video test has passed and terminates the instruction to capture the one or more display screen snapshots. For example, the video analysis system may transmit a message indicating that the video test has passed and terminate the instruction to capture the one or more display screen snapshots when the recognized information is determined to correspond to the reference information.

At step 732, the video analysis system determines performance information. The video analysis system may determine performance information using, for example, the techniques described with reference to FIG. 3A. In some instances, the video analysis system may determine the performance information after step 728 and before step 730.

At step 734, the video analysis system transmits a message indicating that the video test has failed and terminates the instruction to capture the one or more display screen snapshots. For example, the video analysis system may transmit a message indicating that the video test has failed and terminate the instruction to capture the one or more display screen snapshots when the recognized information does not correspond to the reference information and the system timer is greater than the time duration indicated by the time information.

With the features described above, various advantages may be achieved. The video analysis system and the oOCR-V technique described herein may provide timer-based test script optimization, improved text, image, and other data comparison with stored or archived data, improved data comparison with non-archived data from a different display screen snapshot, and reduced character recognition confusion (e.g., confusing zero for an alphabet O, confusing one for alphabet I, etc.) using a regular expression-based comparison.

In some instances, the video analysis system may provide more correlations in less time using a system timer instead of a numbered "for" loop (e.g., a loop to capture 5 screen shots). Thus, as long as the correlations are within the specified number of seconds (monitored by a system timer outside the local control of the script), a greater number of correlations may be performed. As a result, the probability of finding a match within a specified number of seconds may be improved.

In some instances, the video analysis system may allow for simpler optimization of the execution time of a test script by changing the number of seconds stored in a script variable external to the correlation function because the correlation is implemented using timer-based logic. As a result, all correlations in a set of scripts can be optimized centrally.

In some instances, the video analysis system may reduce execution errors and loop (script) failures that may cause unreliable results by using centralized logic that may be less influenced by network latency (e.g., when performing portions of the video test automation off-shore). Once the number of seconds required per correlation is set after a dry execution, the cumulative time required to execute an automated test run may become predictable. The cumulative correlation time (e.g., the number of seconds required per correlation multiplied by total number of correlations) may be the higher limit of total execution time since many of the correlation loops will be exited before the system timer expires.

In some instances, the use of regular expressions in the correlation-function may increase the accuracy of test results because the recognition technique may not mistake letters for numbers and vice versa. In addition, the number of recognition failures (e.g., incorrectly recognizing an "a" as an "o") may be negligible (e.g., within error tolerance) over the total number of analyzed snapshots (e.g., 4-5 errors over hundreds of analyzed snapshots may be within a predetermined error tolerance such as five percent).

The various features described above are merely nonlimiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method comprising:
   transmitting, by a system comprising one or more computing devices, an instruction to capture screen snapshots during a time duration;
   receiving, by the system, information related to the screen snapshots;
   determining, by the system, recognized information in one of the screen snapshots;
   transmitting, by the system and based on a determination that the recognized information corresponds to predetermined reference information, an instruction to terminate capturing the screen snapshots; and
   determining, by the system, performance information based on the recognized information,
   wherein determining the performance information comprises determining the performance information based on a time corresponding to the one of the screen snapshots, and
   wherein the performance information comprises content delivery performance information.

2. The method of claim 1, wherein the recognized information comprises one or more of a character, a text string, an icon, or an image.

3. The method of claim 1, further comprising:
   receiving, by the system, the predetermined reference information; and
   determining that the one of the screen snapshots comprises the predetermined reference information.

4. The method of claim 1, further comprising:
   transmitting, by the system and based on the determination that the recognized information corresponds to the predetermined reference information, an indication that a video test was successful.

5. The method of claim 1, wherein transmitting the instruction to capture the screen snapshots comprises transmitting an instruction to initiate a timer, and wherein the screen snapshots comprise screen snapshots captured before the timer exceeds the time duration.

6. A method comprising:
   transmitting, by a system comprising one or more computing devices, an instruction to capture screen snapshots of a content item during a specified time duration;
   determining, by the system, that a captured screen snapshot comprises predetermined text;
   determining, by the system and based on determining that the captured screen snapshot comprises the predetermined text, a display time corresponding to the captured screen snapshot; and
   determining, by the system, and based on the display time, performance information of a content delivery system,
   wherein the performance information comprises content delivery performance information.

7. The method of claim 6, wherein the predetermined text comprises a character or a text string.

8. The method of claim 6, wherein the instruction to capture the screen snapshots comprises an instruction to initiate a timer, and wherein the captured screen snapshot is captured before the timer exceeds the specified time duration.

9. The method of claim 6, wherein determining the performance information comprises determining a latency of the content delivery system.

10. The method of claim 9, wherein the content delivery system delivers the content item.

11. A method comprising:
   determining, by a system comprising one or more computing devices, an expected output time of a video frame, in a content item, comprising reference information;
   transmitting, by the system, an instruction to capture one or more screen snapshots of the content item;
   determining, by the system and based on the one or more screen snapshots, a realized output time of the video frame; and
   determining, by the system and based on a difference between the expected output time and the realized output time, performance information,
   wherein the performance information comprises content delivery performance information.

12. The method of claim 11, wherein the reference information comprises one or more of a character, a text string, an icon, or an image.

13. The method of claim 11, wherein the instruction to capture the one or more screen snapshots comprises an instruction to initiate a timer, and wherein the one or more screen snapshots are captured before the timer exceeds a predetermined time duration.

14. The method of claim 11, wherein determining the performance information comprises determining a latency of a content delivery system.

15. The method of claim 11, further comprising transmitting an instruction to terminate capturing the one or more screen snapshots.

16. The method of claim 11 wherein determining the realized output time comprises determining that a screen snapshot of the one or more screen snapshots comprises the reference information.

17. One or more computing devices comprising:
   one or more processors; and
   memory storing instructions that, when executed by the one or more processors, cause the one or more computing devices to:
      transmit an instruction to capture screen snapshots during a time duration;
      receive information related to the screen snapshots;
      determine recognized information in one of the screen snapshots;
      transmit, based on a determination that the recognized information corresponds to predetermined reference information, an instruction to terminate capturing the screen snapshots; and
      determine performance information based on the recognized information,
      wherein determining the performance information comprises determining the performance information based on a time corresponding to the one of the screen snapshots, and
      wherein the performance information comprises content delivery performance information.

18. A system comprising:
   one or more computing devices comprising:
      one or more processors; and
      memory storing instructions that, when executed by the one or more processors of the one or more computing devices, cause the one or more computing devices to:
         transmit an instruction to capture screen snapshots during a time duration;
         receive information related to the screen snapshots;
         determine recognized information in one of the screen snapshots;
         transmit, based on a determination that the recognized information corresponds to predetermined reference information, an instruction to terminate capturing the screen snapshots; and
         determine performance information based on the recognized information,
         wherein determining the performance information comprises determining the performance information based on a time corresponding to the one of the screen snapshots, and
         wherein the performance information comprises content delivery performance information; and
   a device comprising:
      one or more processors; and
      memory storing instructions that, when executed by the one or more processors of the device, cause the device to:
         receive the instruction.

* * * * *

UNITED STATES PATENT AND TRADEMARK OFFICE
CERTIFICATE OF CORRECTION

PATENT NO. : 10,355,967 B2
APPLICATION NO. : 14/641803
DATED : July 16, 2019
INVENTOR(S) : Ambud Sharma Page 1 of 1

It is certified that error appears in the above-identified patent and that said Letters Patent is hereby corrected as shown below:

In the Specification

Column 10, Detailed Description, Line 61:
Delete "Tcx1" and insert --"Tcxl"--

Column 10, Detailed Description, Line 66-67:
Delete "{;Text;Text; Tex1;Tcx1;Text}." and insert --{;Text;Text;Tex1;Tcxl;Text}.--

Column 11, Detailed Description, Line 13:
Delete "Tcx1" and insert --"Tcxl"--

Column 11, Detailed Description, Line 24:
Delete "540" and insert --532--

Column 13, Detailed Description, Line 65-66:
Delete "340, 440, 540)." and insert --340, 440, 542).--

Signed and Sealed this
Twenty-ninth Day of October, 2019

Andrei Iancu
*Director of the United States Patent and Trademark Office*